United States Patent
Brunken, Jr.

(10) Patent No.: US 8,640,985 B2
(45) Date of Patent: Feb. 4, 2014

(54) CO-ROTATING STACKED ROTOR DISKS FOR IMPROVED HOVER PERFORMANCE

(75) Inventor: John E. Brunken, Jr., Colleyville, TX (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 13/321,429

(22) PCT Filed: May 22, 2009

(86) PCT No.: PCT/US2009/044963
§ 371 (c)(1),
(2), (4) Date: Nov. 18, 2011

(87) PCT Pub. No.: WO2010/134924
PCT Pub. Date: Nov. 25, 2010

(65) Prior Publication Data
US 2012/0061509 A1    Mar. 15, 2012

(51) Int. Cl.
B64C 27/00    (2006.01)
(52) U.S. Cl.
USPC .............................. 244/39; 244/17.23; 244/6
(58) Field of Classification Search
USPC ........................................................... 244/39
See application file for complete search history.

(56) References Cited

U.S. PATENT DOCUMENTS

| | | | | |
|---|---|---|---|---|
| 2,481,750 | A | * | 9/1949 | Hiller, Jr. et al. ............. 416/115 |
| 3,002,711 | A | * | 10/1961 | Stefano ...................... 244/17.23 |
| 3,035,789 | A | * | 5/1962 | Young ........................... 244/7 C |
| 3,684,398 | A | * | 8/1972 | Davidson et al. ............. 416/155 |
| 3,784,319 | A | * | 1/1974 | Amer et al. .................... 416/135 |
| 3,905,656 | A | | 9/1975 | Cochrane |
| 4,589,611 | A | * | 5/1986 | Ramme et al. .................... 244/6 |
| 4,881,874 | A | * | 11/1989 | White et al. ................... 416/138 |
| 5,066,195 | A | * | 11/1991 | Dobrzynski .............. 416/200 R |
| 5,096,383 | A | * | 3/1992 | Dobrzynski .............. 416/200 R |
| 5,190,242 | A | * | 3/1993 | Nichols ........................ 244/12.2 |
| 5,381,985 | A | * | 1/1995 | Wechsler et al. ............. 244/7 C |
| 6,450,446 | B1 | * | 9/2002 | Holben ........................ 244/34 A |
| 6,616,095 | B2 | * | 9/2003 | Stamps et al. ............. 244/17.13 |

(Continued)

FOREIGN PATENT DOCUMENTS

CH    677844 A5    6/1991
EP    2432690        3/2012

(Continued)

OTHER PUBLICATIONS

Extended European Search Report from Application 09845035.6-2422 issued by the European Patent Office dated Apr. 18, 2012.

(Continued)

*Primary Examiner* — Christopher P Ellis
*Assistant Examiner* — Medhat Badawi
(74) *Attorney, Agent, or Firm* — James E. Walton

(57) ABSTRACT

The system of the present application represents a rotor hub for a rotorcraft and a rotorcraft incorporating the rotor hub. The rotor hub is represented as having multiple rotor disk assemblies, each rotor disk assembly rotating in the same direction about the same mast axis of rotation. In the preferred embodiment, each rotor disk assembly has three rotor blades. The upper rotor disc assembly and the lower rotor disk assembly are separated by approximately 2.5% of the rotor disk diameter, at least to take advantage of "wake contraction".

17 Claims, 4 Drawing Sheets

(56) References Cited

U.S. PATENT DOCUMENTS

| | | | |
|---|---|---|---|
| 6,695,106 B2* | 2/2004 | Smith et al. ................ 188/378 |
| 7,083,142 B2* | 8/2006 | Scott ........................ 244/17.13 |
| 7,143,973 B2* | 12/2006 | Ballew ............................ 244/6 |
| 7,210,651 B2* | 5/2007 | Scott ........................ 244/17.13 |
| 7,264,199 B2* | 9/2007 | Zientek ..................... 244/17.11 |
| 7,648,338 B1* | 1/2010 | Welsh ............................ 416/1 |
| 7,789,341 B2* | 9/2010 | Arlton et al. ............. 244/17.23 |
| 8,033,498 B2* | 10/2011 | Blackburn ............... 244/17.23 |
| 8,328,128 B2* | 12/2012 | Wiggerich ............... 244/17.23 |
| 2004/0179941 A1 | 9/2004 | Negulescu |
| 2005/0067527 A1 | 3/2005 | Petersen |
| 2006/0011777 A1* | 1/2006 | Arlton et al. ................ 244/7 B |
| 2007/0158494 A1 | 7/2007 | Burrage |
| 2007/0181742 A1* | 8/2007 | Van de Rostyne et al. 244/17.23 |

FOREIGN PATENT DOCUMENTS

| | | |
|---|---|---|
| FR | 1316302 A | 1/1963 |
| GB | 2409845 A | 7/2005 |
| WO | 2010134920 A1 | 11/2010 |
| WO | 2010134921 A1 | 11/2010 |

OTHER PUBLICATIONS

International Preliminary Report on Patentability of the International Preliminary Examining Authority mailed by IPEA/USA, U.S. Patent and Trademark Office on Jul. 13, 2012 for related International Patent Application No. PCT/US09/44955, 7 pages.

International Search Report and the Written Opinion of the International Searching Authority mailed by ISA/USA, U.S. Patent and Trademark Office on Jul. 14, 2009 for related International Patent Application No. PCT/US09/44895, 8 pages.

International Preliminary Report on Patentability of the International Preliminary Examining Authority mailed by IPEA/USA, U.S. Patent and Trademark Office on Dec. 12, 2011 for related International Patent Application No. PCT/US09/44895, 6 pages.

Extended European Search Report mailed from the European Patent Office Mar. 21, 2012 from related European Patent Application No. 09845032.3-1254, 5 pages.

International Search Report and the Written Opinion of the International Searching Authority mailed by ISA/USA, U.S. Patent and Trademark Office on Nov. 13, 2009 for related International Patent Application No. PCT/US09/44955, 7 pages.

Extended European Search Report from European Patent Office in related European Patent Application No. 09845034, mailed Sep. 14, 2012, 6 pages.

International Search Report and the Written Opinion of the International Searching Authority mailed by ISA/USA, U.S. Patent and Trademark Office on Jul. 14, 2009 for International Patent Application No. PCT/US09/44963, 9 pages.

International Preliminary Examination Report mailed by IPEA/USA, U.S. Patent and Trademark Office on Oct. 11, 2011 for International Patent Application No. PCT/US09/44963, 8 pages.

Examination Report from European Patent Office in related European Patent Application No. 09845035, mailed Nov. 27, 2012, 6 pages.

Canadian Office Action in related Canadian patent application No. 2,762,247, mailed 18 Oct. 2013, 4 pages.

* cited by examiner

CO-ROTATING STACKED ROTOR DISKS FOR IMPROVED HOVER PERFORMANCE

TECHNICAL FIELD

The present application relates in general to the field of rotor systems for rotorcraft.

DESCRIPTION OF THE PRIOR ART

There are many different types of rotorcraft, including helicopters, tandem rotor helicopters, tiltrotor aircraft, four-rotor tiltrotor aircraft, tilt wing aircraft, and tail sitter aircraft. In all of these rotorcraft, thrust and/or lift is generated by air flowing through a rotor disk formed by a plurality of rotating rotor blades. Typically, the plurality of rotor blades are mechanically coupled with and substantially evenly spaced about a rotatable mast, which provides rotational motion to the plurality of rotor blades.

FIG. 1 depicts a military tiltrotor aircraft 101 with conventional rotor hubs 107a and 107b. Rotor hubs 107a and 107b are mechanically coupled to nacelles 103a and 103b, respectively. Nacelles 103a and 103b are rotably attached to wing members 105a and 105b, respectively. Wing members 105a and 105b are rigidly fixed to fuselage 109. Rotor hubs 107a and 107b have a plurality of rotor blades 111a and 111b, respectively. The tiltrotor aircraft 101 of FIG. 1 is depicted in helicopter mode, with nacelles 103a and 103b directed up.

FIG. 2 depicts a commercial tiltrotor aircraft 201 with conventional rotor hubs 207a and 207b. Rotor hubs 207a and 207b are mechanically coupled to nacelles 203a and 203b, respectively. Nacelles 203a and 203b are rotably attached to wing members 205a and 205b, respectively. Wing members 205a and 205b are rigidly fixed to fuselage 209. Rotor hubs 207a and 207b have a plurality of rotor blades 211a and 211b, respectively. FIG. 2 depicts tiltrotor aircraft 201 in airplane mode, with nacelles 203a and 203b directed forward.

It is often desirable to utilize a greater number of rotor blades in the rotor system, rather than a fewer number, to increase lift and/or thrust of a rotorcraft. One well known rotor system has an upper disk assembly and lower disk assembly, each rotor disk assembly rotating about the same mast axis of rotation, while each disk assembly rotates in opposite directions. Such designs are often referred to as counter-rotating co-axial rotors. Typically, counter-rotating co-axial rotor systems on a helicopter do not need a tail rotor or other anti-torque device because each rotor acts to cancel the torque that would otherwise be induced into the helicopter. Counter-rotating co-axial rotor systems also typically provide better hover performance than single disk rotor systems.

There are many rotorcraft rotor systems well known in the art; however, considerable room for improvement remains.

BRIEF DESCRIPTION OF THE DRAWINGS

The novel features believed characteristic of the system of the present application are set forth in the appended claims. However, the system itself, as well as, a preferred mode of use, and further objectives and advantages thereof, will best be understood by reference to the following detailed description when read in conjunction with the accompanying drawings, wherein:

Figure 1:
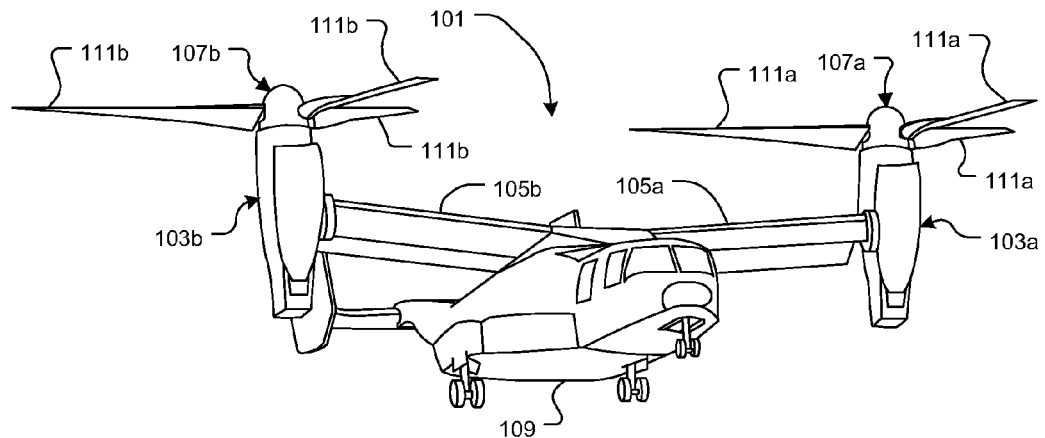
FIG. 1 is a perspective view of a prior art tiltrotor aircraft in helicopter mode.
Figure 2:
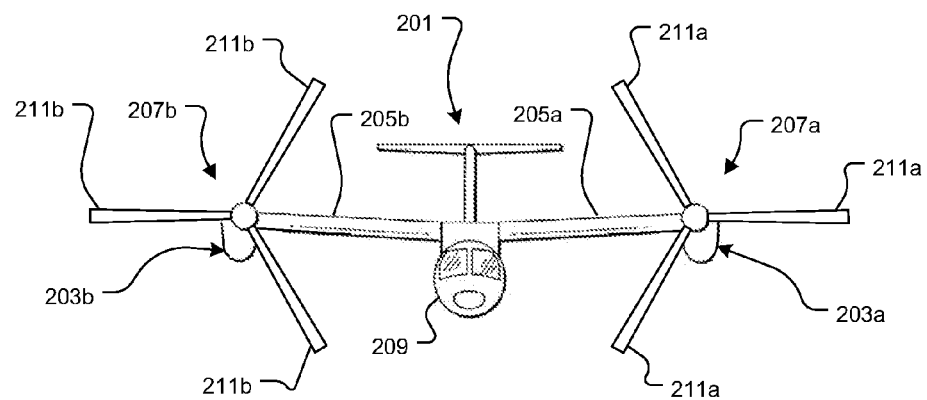
FIG. 2 is a front view of a prior art tiltrotor aircraft in airplane mode.

While the system of the present application is susceptible to various modifications and alternative forms, specific embodiments thereof have been shown by way of example in the drawings and are herein described in detail. It should be understood, however, that the description herein of specific embodiments is not intended to be limited to the particular forms disclosed, but on the contrary, the application is to cover all modifications, equivalents, and alternatives falling within the spirit and scope of the present application as defined by the appended claims.

DESCRIPTION OF THE PREFERRED EMBODIMENT

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The system of the present application represents a rotor hub for a rotorcraft and a rotorcraft incorporating the rotor hub. The rotor hub is represented as having multiple rotor disk assemblies, each rotor disk assembly rotating in the same direction about the same mast axis of rotation. In the preferred embodiment, each rotor disk assembly has three rotor blades. The upper rotor disc assembly and the lower rotor disk assembly are separated by approximately 2.5% of the rotor disk diameter, at least to take advantage of "wake contraction".

Figure 3:
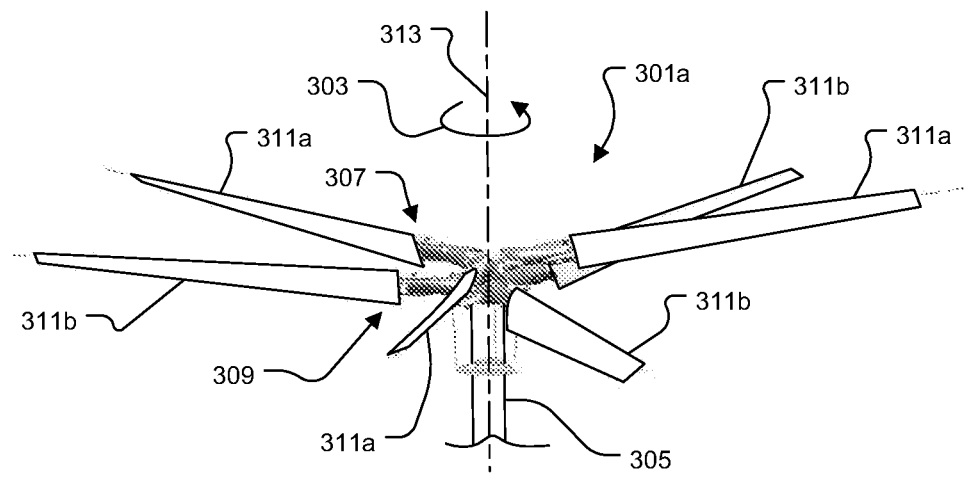
FIG. 3 is a perspective view of a rotor hub according to the preferred embodiment of the present application.

Referring now to FIG. 3 in the drawings, FIG. 3 is a perspective view of a rotor hub 301a according to the preferred embodiment of the present application. Rotor hub 301a has an upper rotor disk assembly 307 and a lower rotor disk assembly 309. Upper rotor disk assembly 307 includes the structure necessary to attach a plurality of upper rotor blades 311a to a rotor mast 305. Similarly, lower rotor disk assembly 309 includes the structure necessary to attach a plurality of lower rotor blades 311b to rotor mast 305. Even though FIG. 3 depicts upper rotor disk assembly 307 and lower rotor disk assembly each having three rotor blades 311a and 311b, respectively; it should be appreciated that it is contemplated that alternative embodiments being configured to have more or less rotor blades 311a and 311b in each rotor disk assembly 307 and 309, respectively. Rotor blades 311a and 311b are co-axial, meaning that rotor blades 311a and 311b rotate about a same axis of rotation 313. Rotor blades 311a and 311b are also co-rotating, meaning that rotor blades 311a and 311b rotate in the same direction about axis of rotation 313. In FIG. 3, rotor blades 311a and 311b rotate in a counter clockwise direction (CCW) 303. A rotor hub 301b is a symmetrical version of rotor hub 301a, thereby being configured to rotate in the opposite direction of rotor hub 301a.

Figure 4:
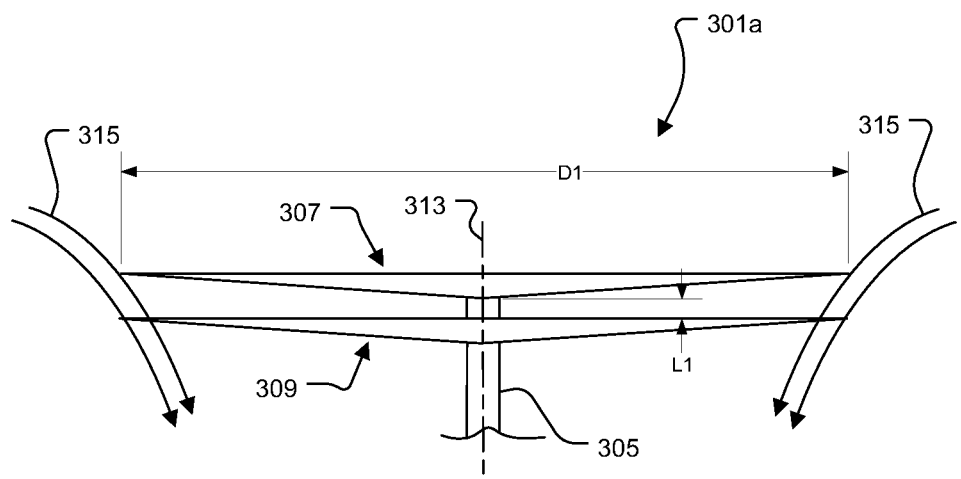
FIG. 4 is a stylized schematic front view of the rotor hub from FIG. 3, according the preferred embodiment of the present application.

FIG. 4 is a stylized view of rotor hub 301a, which depicts the spacing of upper rotor disk assembly 307 and lower rotor disk assembly 309 in order to take advantage of "wake contraction". Wake contraction is the term given to describe how air is compressed as it flows through upper rotor disk assembly 307 toward lower rotor disk assembly 309, thereby facilitating a clean air 315 to be introduced to lower rotor disk assembly 309. Clean air 315 is generally the air that has not been directly accelerated through the upper rotor disk assembly 307, but is air taken in by lower rotor disk assembly 309 that is outside of the contracted wake caused by the upper rotor disk assembly 307. The introduction of clean air 315 increases the effective diameter, or area, of lower rotor disk assembly 309, thereby increasing the efficiency and improving the performance of rotor hub 301a. In the preferred embodiment, the approximate distance between upper rotor disk assembly 307 and lower rotor disk assembly 309, to take advantage of wake contraction, is shown in FIG. 4 as L1. L1 is approximately 2.5% of D1, where D1 is the diameter of rotor disk assemblies 307 and 309. It should be appreciated that D1 and L1, as well as the approximately 2.5% relationship, can vary according to factors such as rotor blade chord length, number of rotor blades, rotor mast RPM, and the like. The system of the present application contemplates adjusting D1, L1, and the 2.5% between relationship D1 and L1, along with aircraft requirements, in order to maximize benefit the introduction of clean air 315 through wake contraction in rotor hub 301a.

Figure 5:
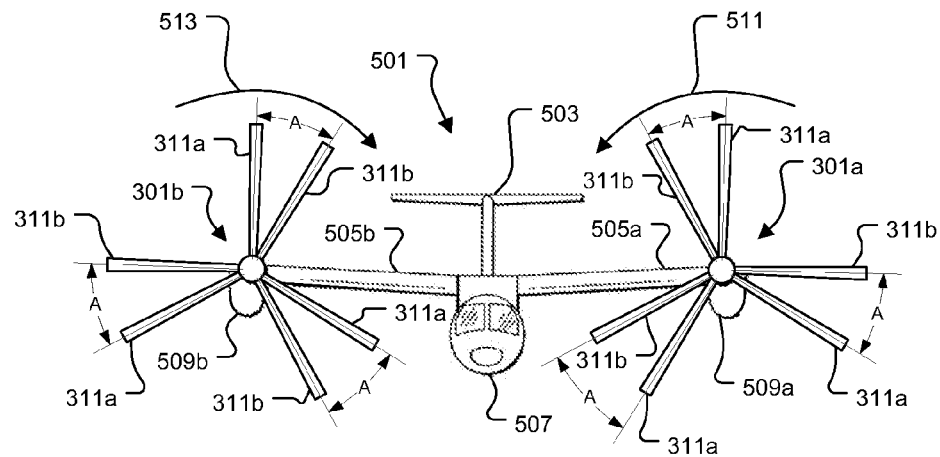
FIG. 5 is a front view of a tiltrotor aircraft having a rotor hub of the preferred embodiment of the present application.

Referring now to FIG. 5, a tiltrotor 501 has a tail member 503 carried by a fuselage 507, wing members 505a and 505b are attached to fuselage 507, and nacelles 509a and 509b rotably coupled to wing members 505a and 505b, respectively. Rotor hub 301a is operably associated with nacelle 509a. Similarly, rotor hub 301b is operably associated with nacelle 509b. In tiltrotor 501, rotor hub 301a, carried by nacelle 509a, rotates in a CCW direction 511. In contrast, rotor hub 301b, carried by nacelle 509b, rotates in a CW direction 513. As previously stated, rotor hub 301b is a symmetrical version of rotor hub 301a. Because each rotor hub 301a and 301b rotate in opposite directions, torque acting on tiltrotor 501 is cancelled, thereby making it unnecessary for an anti-torque device, such as a tailrotor. Nacelles 509a and 509b are configured to rotate between an airplane mode, wherein nacelles 509a and 509b are positioned forward; and a helicopter mode, wherein nacelles 509a and 509b are positioned vertically. During helicopter mode, the vertical positioning of nacelles 509a and 509b allows tiltrotor 501 to fly similar to a helicopter. During airplane mode, the forward positioning of nacelles 509a and 509b allows tiltrotor 501 to fly similar to an airplane, wherein wing members 505a and 505b provide lift, while nacelles 509a and 509b provide forward thrust. Tiltrotor 501 has the ability to transition between airplane mode and helicopter mode, during flight, by rotating nacelles 509a and 509b. Furthermore, fuselage 507 is configured to carry at least one of cargo and passengers. It should be appreciated that tail member 503 is exemplary of a wide variety of possible configurations that would be sufficient to provide directional stability for tiltrotor 501.

FIG. 5 also depicts the blade spacing in the preferred embodiment of rotor hub 301a and 301b. Lower rotor disk assembly 309 is clocked forward of upper rotor disk assembly 307 by a selected angle A. In the preferred embodiment, selected angle A is 30°; however, selected angle A may also be other angles depending upon factors; such as: number of rotor blades 311a and 311b, desired aircraft performance, as well as vibration requirements.

Figure 6:
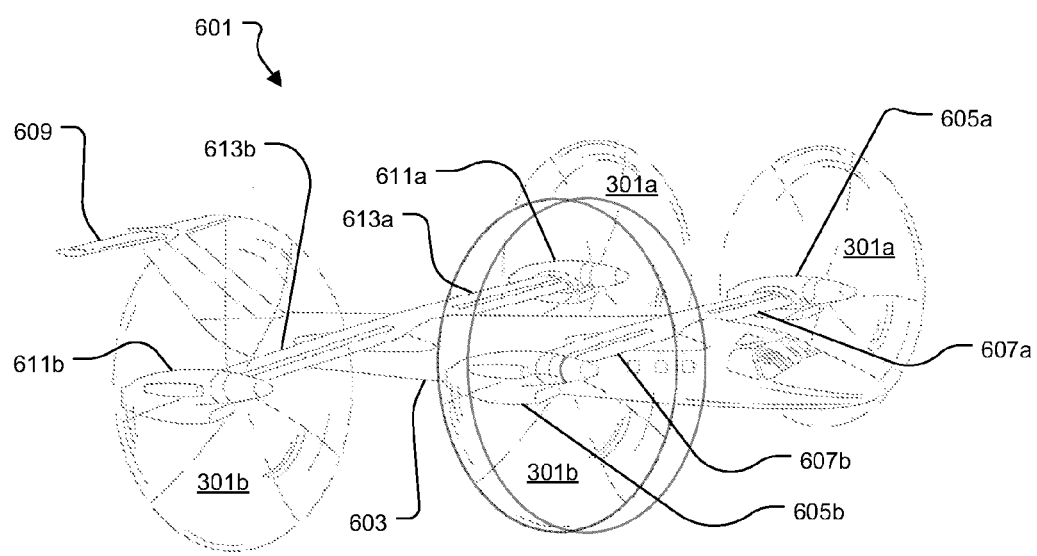
FIG. 6 is a perspective view of a quad tiltrotor aircraft having a rotor hub of the preferred embodiment of the present application.

Referring now to FIG. 6, a quad tiltrotor 601 has a tail member 609 carried by a fuselage 603. Wing members 607a, 607b, 613a, and 613b are attached to fuselage 603. Nacelles 605a and 605b are rotably coupled to wing members 607a and 607b, respectively. Similarly, nacelles 611a and 611b are rotably coupled to wing members 613a and 613b, respectively. First rotor hub 301a is operably associated with nacelle 605a, and second rotor hub 301a is operably associated with nacelle 611a. Similarly, rotor hub 301b is operably associated with nacelle 605b, and second rotor hub 301b is operably associated with nacelle 611b. Nacelles 605a, 605b, 611a, and 611b are configured to rotate between an airplane mode, wherein nacelles 605a, 605b, 611a, and 611b are positioned forward; and a helicopter mode, wherein nacelles 605a, 605b, 611a, and 611b are positioned vertically. During helicopter mode, the vertical positioning of nacelles 605a, 605b, 611a, and 611b allows quad tiltrotor 601 to fly similar to a helicopter. During airplane mode, the forward positioning of nacelles 605a, 605b, 611a, and 611b allows quad tiltrotor 601 to fly similar to an airplane, wherein wing members 607a, 607b, 613a, and 613b provide lift, while nacelles 605a, 605b, 611a, and 611b provide forward thrust. Quad tiltrotor 601 has the ability to transition between airplane mode and helicopter mode during flight by rotating nacelles 605a, 605b, 611a, and 611b. Furthermore, fuselage 603 is configured to carry cargo, as well as passengers. It should be appreciated that tail member 609 is exemplary of a wide variety of possible configurations that would be sufficient to provide directional stability for quad tiltrotor 601.

Figure 7:
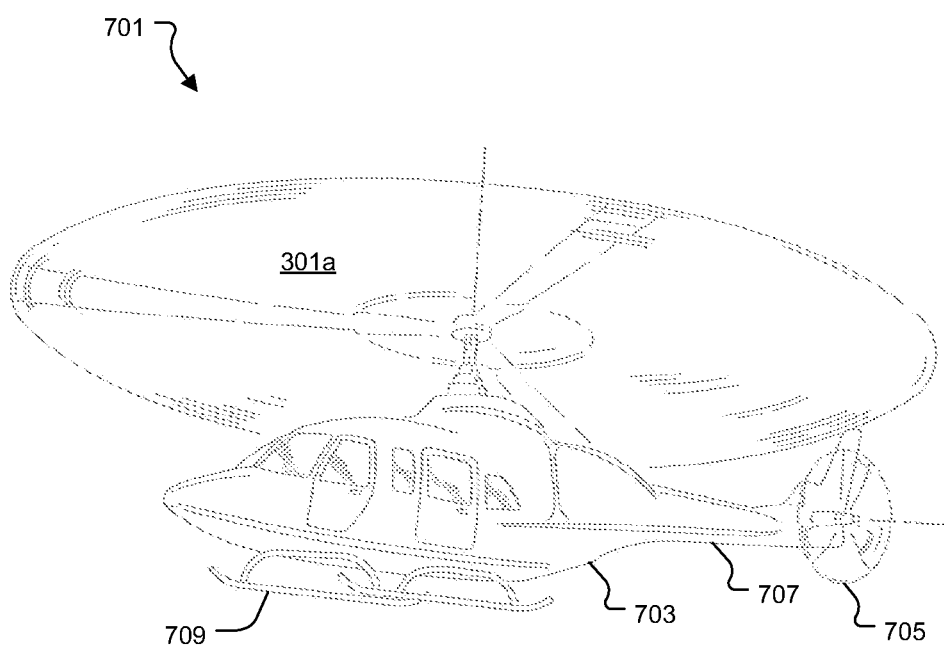
FIG. 7 is a perspective view of a helicopter aircraft having a rotor hub of the preferred embodiment of the present application.

Referring now to FIG. 7, a helicopter 701 has a tail member 707 carried by a fuselage 703. A landing gear 709 is coupled to fuselage 703. A tail rotor 705 is operably associated with tail member 707. Rotor hub 301a is operably associated with fuselage 703. Because rotor hub 301a reacts torque upon fuselage 703, tail rotor 705, or another anti-torque device, is required to counter the torque reacted by rotor hub 301.

The system of the present application provides significant advantages, including: (1) providing a way to utilize a plurality of rotor blades in a rotorcraft while increasing the performance of the rotor system; (2) spacing multiple co-rotating rotor disks so as to maximize performance through wake contraction; and (3) incorporating co-rotating co-axial rotor disks on a rotorcraft, thereby improving performance of the rotorcraft.

It is apparent that a rotor system with significant advantages has been described and illustrated. Although the system of the present application is shown in a limited number of forms, it is not limited to just these forms, but is amenable to various changes and modifications without departing from the spirit thereof.

The invention claimed is:

1. A rotor hub for a rotorcraft, comprising:
   an upper rotor disk assembly having a plurality of upper rotor blades;
   a lower rotor disk assembly having a plurality of lower rotor blades;
   wherein the upper rotor disk assembly and the lower rotor disk assembly are configured to rotate in a same direction and about a same axis of rotation;
   wherein the upper rotor disk assembly and the lower rotor disk assembly are spaced apart a distance to permit the lower rotor disk assembly to take air in that is outside of a contracted wake caused by the upper rotor disk assembly, so as to increase the effective diameter or area of lower rotor disk assembly.

2. The rotor hub according to claim 1, wherein the upper rotor disk assembly and the lower rotor disk assembly are spaced apart along the axis of rotation so as to introduce clean air to the lower rotor disk assembly.

3. The rotor hub according to claim 1, wherein the upper rotor disk assembly and the lower rotor disk assembly are configured to rotate in a counter clockwise direction about the axis of rotation.

4. The rotor hub according to claim 1, wherein the upper rotor disk assembly and the lower rotor disk assembly are configured to rotate in a clockwise direction about the axis of rotation.

5. The rotor hub according to claim 1, wherein the upper rotor disk assembly and the lower rotor disk assembly are attached to a rotor mast.

6. The rotor hub according to claim 2, wherein the introduction of clean air to the lower rotor disk assembly increases an effective rotor disk area of the lower rotor disk assembly, thereby increasing performance of the rotor hub.

7. The rotor hub according to claim 2, wherein the upper rotor disk assembly and the lower rotor disk assembly are spaced apart along the axis of rotation by approximately 2.5% of a diameter of the upper rotor disk assembly.

8. The rotor hub according to claim 2, wherein the upper rotor disk assembly is clocked by 30° relative to the lower rotor disk assembly.

9. The rotor hub according to claim 1, wherein the plurality of upper rotor blades are equally spaced about the axis of rotation.

10. The rotor hub according to claim 1, wherein the plurality of lower rotor blades are equally spaced about the axis of rotation.

11. The rotor hub according to claim 1, wherein the plurality of upper rotor blades includes three upper rotor blades.

12. The rotor hub according to claim 1, wherein the plurality of lower rotor blades includes three lower rotor blades.

13. A rotorcraft, comprising:
   a fuselage;
   a tail member carried by the fuselage;
   a landing gear coupled to the fuselage;
   an anti-torque device operably associated with the tail member;
   a rotor hub operably associated with the fuselage, the rotor hub comprising:
      an upper rotor disk assembly having a plurality of upper rotor blades;
      a lower rotor disk assembly having a plurality of lower rotor blades;
      wherein the upper rotor disk assembly and the lower rotor disk assembly are configured to rotate in a single direction and about a single axis of rotation;
      wherein the upper rotor disk assembly and the lower rotor disk assembly are spaced apart a distance to permit the lower rotor disk assembly to take air in that is outside of a contracted wake caused by the upper rotor disk assembly, so as to increase the effective diameter or area of lower rotor disk assembly.

14. The rotorcraft according to claim 13, wherein the upper rotor disk assembly and the lower rotor disk assembly are spaced apart along the axis of rotation so as to take advantage of wake contraction, thereby increasing an effective diameter of the lower rotor disk assembly.

15. The rotorcraft according to claim 13, wherein the lower rotor disk assembly is clocked by 30° to the upper rotor disk assembly.

16. The rotorcraft according to claim 13, wherein the rotor hub rotates in a counterclockwise direction.

17. The rotorcraft according to claim 13, wherein the plurality of upper rotor blades includes three upper rotor blades and the plurality of lower rotor blades is includes three lower rotor blades.

* * * * *